Jan. 28, 1936.   J. C. WICHMANN   2,028,814
AIR CONDITIONER
Filed Sept. 26, 1932
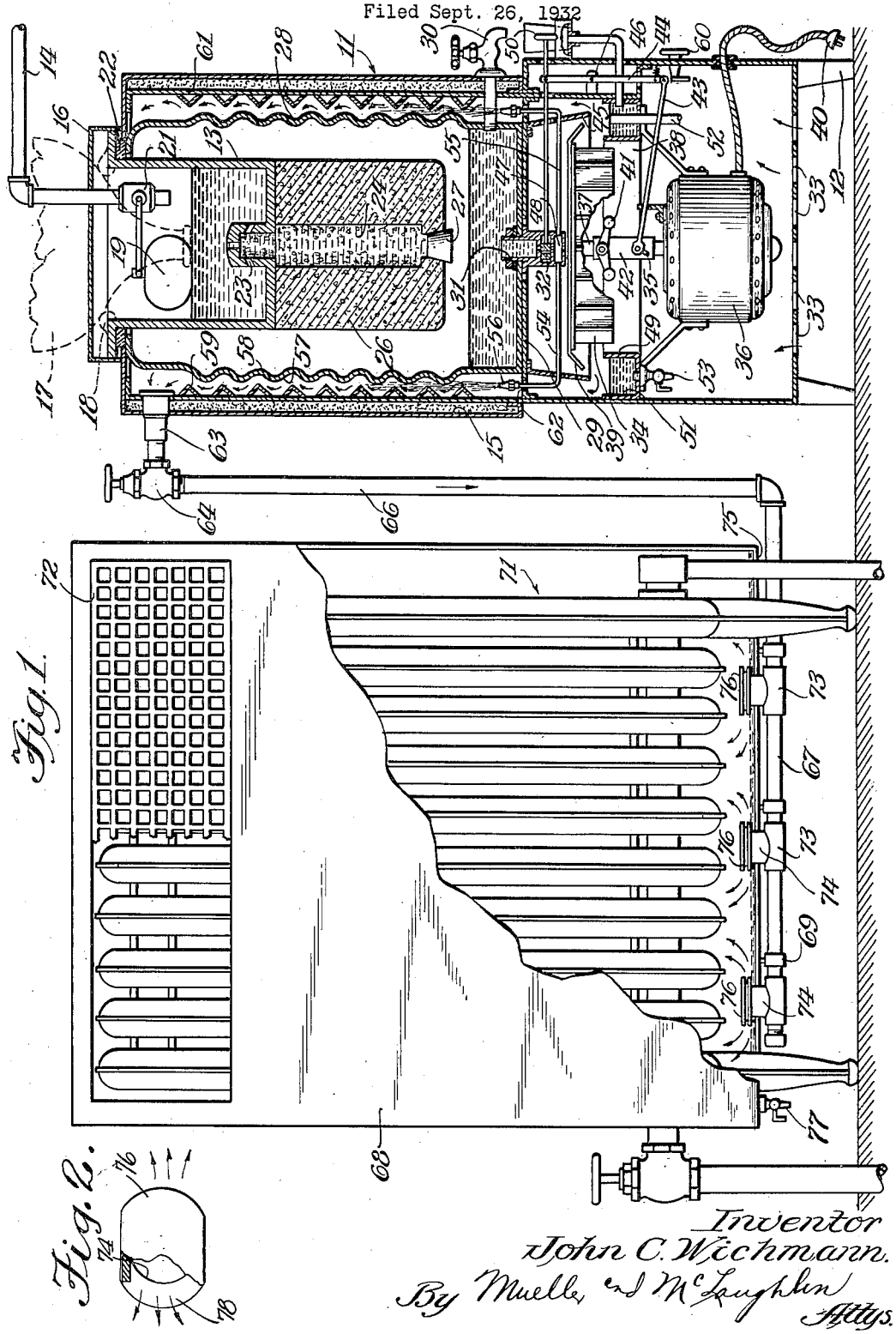
Inventor
John C. Wichmann.
By Mueller and McLaughlin
Attys.

Patented Jan. 28, 1936

2,028,814

UNITED STATES PATENT OFFICE 2,028,814

AIR CONDITIONER

John C. Wichmann, Chicago, Ill.

Application September 26, 1932, Serial No. 634,871

16 Claims. (Cl. 62—154)

My invention relates in general to a combination air conditioning system, and more particularly to such an apparatus as adapted for home and office use.

It is an object of my invention to provide a system for supplying humidified air which may be cooled or heated by employing the ordinary room radiator.

It is also an object of my invention to utilize in connection therewith the ordinary steam or hot water radiator commonly employed for heating purposes, thus reducing the necessary added space for installation, and providing a complete system at a lower cost.

A further object is to not only provide cooled or heated humidified air but that which is purified to a very high degree.

Another object is to provide a combination air humidifier and water cooler, all operated from a single source of power.

A further object is to provide a system whereby the purified humidified air employed for cooling drinking water is passed over a radiator and into a room in which the apparatus is installed.

Other objects and features of the invention will be apparent from a consideration of the following detailed description taken with the accompanying drawing, wherein Fig. 1 is a vertical cross-section of a portion of the apparatus and a full front view of the remainder thereof.

Fig. 2 is a top plan view of the air spray caps with a portion of the top of the cap broken away.

Air purifying and humidifying systems coupled with cooling apparatus in use at the present time are both expensive and cumbersome, requiring a large area in which the baffle plates and air-water spray system are installed for washing the air prior to cooling it to be circulated into the room. In my invention, I utilize the ordinary radiator employed in a heating system and by combining an air humidifying and purifying system therewith provide cooled air or heated air, as may be desired, properly purified and humidified without a cumbersome and expensive installation.

Referring now to the drawing, I provide an air washing and purifying unit comprising a closed cabinet 11 mounted on legs 12 divided into a lower and upper closed compartment. A jacket 15 preferably filled with fuller's earth encircles the upper portion of the cabinet. I have found that fuller's earth not only serves as an insulator, but because of its mineral components acts to cool the water in the system. Any other suitable insulator may be substituted to provide insulation. Ordinary city water is carried into a tank 13 through a pipe 14 projecting through a cover 16 of the upper compartment. I may also supply water to the system by means of a bottle 17 inverted and resting on a rubber collar 18 with the neck projecting into the tank 13. Water rises in the tank 13 and if supplied from the ordinary city water system a float 19 operates a valve 21 in the inlet 14 to shut off the system at the desired depth of the water. The tank 13 rests upon rubber gaskets 22 in the top of the upper compartment completely sealing same. Water is fed from the tank 13 through outlets 23 into a charcoal filter 24 and from there passes through any brick or mineral filter 26 constructed integral with the bottom of the tank 13. A rubber stopper 27 in the bottom of the filter 26 provides for replacement of charcoal 24 when it has become filled with impurities. The water passes through the filter 26 into the bottom of a container 28 resting on the shelf 29 which separates the upper and lower compartments. An outlet 31 is properly sealed in the bottom of the container 28 with a sliding valve 32 built at the lower end thereof. The purified water in the container 28 is also suitable for drinking purposes and a faucet 30 is connected to a pipe leading from the container 28 to supply the water for this purpose.

The air from the room is drawn into the apparatus through holes 33 in the base of the lower compartment. This is accomplished by means of a centrifugal fan 34 driven by a motor 36. The motor may be connected to any suitable electric outlet in the room by means of plug 40. The motor is mounted in the lower compartment and drives the fan 34 by means of a shaft 37 extending vertically through an annular opening 38. As the fan is rotated, air is drawn through the openings 33 up through the opening 38 and circulated in a path shown by the arrows. The path of this air after coming up through the opening 38 is deflected downwardly by means of the plate 39 whose outer edges project over the outside of the upper portion of the fan.

A governor 41 carried by the motor shaft 37 acts upon a sleeve 42 having an annular slot 35 in the wall thereof, so that as the sleeve 42 moves up and down by the action of the governor, the slot 35 which carries the link 43 moves the link horizontally accordingly, and, through the action of the intermediate lever 44 pivoted at 46 and shaft 47, opens and closes the valve mechanism 32. The speed of the motor governs the action of the governor which in turn regulates the sliding valve 32 to allow water to drop into the chamber 48, and from there onto the cover 39 of the fan 34. I have found that the humidity in the room is at times normally higher than that most desirable for comfortable living conditions in which case a hand operated valve 50 is provided for shutting off the water supply to the fan and nozzles without interfering with the operation of the fan. To lock the valve closed, the latch 60 is turned to hold the arm 43. When the humidity is again down to the proper point, the valve may be released and its operation then controlled by the action of the governor. The cover 39 may be constructed either of flexible rubber or lead foil so as to protect the motor and also make it possible to push the fan up through the annular opening 38. As a result of the centrifugal force developed by the rotation of the fan, cover 39 is straightened out so as to overlap the edge of the flange 49 forming the wall of the opening 38 to prevent any water from getting down into the motor. This centrifugal force sprays the water from the cover 39 into the annular hood 45 to wash and cool the air as it is blown upward. An annular trough 51 integral with the wall 49 provides a receptacle for the water fed through the needle valve 32. An overflow pipe 52 projects into the trough positioned to take care of the water and prevent it from rising above the top of the pipe. This may empty into any receptacle in the lower compartment. A valve 53 in the bottom of the trough 51 facilitates drawing the water therefrom for draining and cleaning. Filter outlets 54 and 55 extend from the chamber 48 upwardly through holes in the shelf 29 to nozzles 56. These nozzles are below the level of the water in the container 28 and water is sprayed from them by gravity pressure. The nozzles open into an annular chamber 57 formed by the corrugated wall 58 of the container 28 and baffle plates 59 mounted on the wall 61 of the purifying and humidifying unit.

As the air is brought into the unit by means of the fan 34, it is deflected downwardly by the cover 39 and passes over the water lying in the trough 51 and on up through openings 62 in the shelf 29, through which openings the pipes 54 and 55 also extend. The air is humidified and cooled to some extent when passing over the water in the trough 51 and then following the path as noted by the arrows up through the annular chamber 57 water from nozzles 56 is sprayed into the air to wash and purify the same as well as cool it as it passes up through the baffle plates 59 co-operating with the corrugated wall 58. This action also tends to cool the water in the storage device 28, which water may be drawn off through faucet 30 for drinking purposes. After cleaning the air, the water drains through the holes 62 and into the trough 51. Inasmuch as the entire unit is sealed, the pressure from the fan 34 carries the air through an outlet 63 projecting through the outer wall of the unit and connecting through a valve 64 to a vertical pipe 66. The air is then carried through a vertical pipe 66 to pipes 67 extending longitudinally, and mounted on a radiator cover 68 by means of brackets 69. The radiator cover 68 may be constructed of metal, completely enclosing radiator 71. A screened opening 72 may be provided near the upper portion thereof through which the air is blown into the room.

A plurality of T connections 73 are provided on the pipe 67 with the neck 74 of each connection projecting through the cover 68 and extending slightly above the base 75. Slotted disc caps 76 are mounted on each one of these neck openings 74 and operate to spray the air onto the coils of the radiator 71. The cap 76 is shown more in detail in Fig. 2 with the neck 74 discharging the air into the cap to be distributed from slots 78 at each end thereof in the direction shown by the arrows. It is well known that the radiator is ordinarily from 15 to 30 degrees cooler than the room temperature of the room in which it is installed and as the air is sprayed from the slotted disc caps 76 it passes upwardly over the cooled coils and out the screened opening 72. It is found that some condensation occurs on the radiator coils and the subsequent evaporation cools the coils to even a lower temperature so that the air in passing over the radiator is cooled considerably below room temperature. I have found that the temperature standing in the room at 75° may be cooled down to as low as 50° with my system. A pet cock 77 is provided in the bottom of the cover 68 for draining any water which might collect therein as a result of the condensation on the radiator.

The same system may be used to spray purified humidified air onto the heated radiator in the winter-time inasmuch as my system has no connection with the operation of the radiator itself, so that heated pure air is blown through the screened opening 72 when the radiator is used for heating purposes. Whether the system is used in summer or in winter, very beneficial results may be obtained both from the standpoint of comfort and healthful living conditions. By first purifying the water as it passes through the filters 24 and 26, all impurities and pollen are removed. The water later washes the air so that the resulting product is substantially free of all undesirable substances. The flow of water through the outlet 32 may be controlled so that the humidity best suited for living conditions at a desired temperature may be readily obtained. This is particularly true in the winter when the radiator is used for heating, for at that time the humidity in the room is ordinarily low and it is necessary to increase the moisture content of the air for the most healthful living conditions as well as for the protection of furniture which becomes dried out. Blowing this air into the room increases the circulation of the air above that due to ordinary air currents and thus provides for more comfortable living conditions.

Although I have described my system as a whole, employing a particular purifying and humidifying unit, it is also understood that any other such unit may be employed with the air cooling and distributing portion of my apparatus as evidenced by the pipes 66, 67 and outlets 76 in combination with the radiator.

It will be further understood that the nature and embodiments of the invention as a whole herein described and illustrated are merely convenient and useful forms and that many changes and modifications may be made therein without departing from the spirit and scope of the invention.

What I claim as new and desire to protect by Letters Patent of the United States is:

1. An air conditioner and water cooler comprising a central water chamber, a wall surrounding said chamber to provide an annular air conducting chamber, a horizontally disposed fan positioned beneath the water chamber, water nozzles positioned in said air conducting chamber, a conduit for conducting water from the water chamber to said nozzles and to the top of said fan, said fan being positioned to spray such water by centrifugal force into the path of the air from the fan into said annular chamber, and a valve for feeding water from the water chamber to said nozzles and onto said fan during rotation of the latter.

2. A combination water cooler and air conditioner including a drinking water storage device, an annular cooling chamber surrounding the water storage device, a horizontally disposed rotatable fan beneath the cooling chamber for forcing air upwardly through the chamber, means for conditioning the air by feeding a water spray from the storage supply into the path of the air during rotation of the fan, and means for automatically shutting off the water spray when the fan stops rotation.

3. A combination water cooler and air conditioner including a drinking water storage device, an annular cooling chamber surrounding the water storage device, a horizontally disposed rotatable fan beneath the cooling chamber for forcing air upwardly through the chamber, a motor for driving the fan, a valve for feeding water from the storage device, means for conditioning the air by spraying the fed water into the path of the air, and a device controlled by rotation of the motor for opening the valve during rotation of the fan.

4. A combination water cooler and air conditioner including a vertically disposed frame, a water storage receptacle at the upper end of said frame and adapted to receive an up-ended water bottle for feeding water thereto, water and air cooling chambers surrounding the water storage receptacle, a horizontally disposed rotatable fan positioned beneath the water storage receptacle and adapted to force a current of air through the cooling chamber, and means for automatically feeding a spray of water to the air only during operation of the fan.

5. A combination water cooler and air conditioner including a drinking water supply receptacle, a cooling chamber surrounding said water receptacle, a horizontally disposed rotatable fan positioned beneath the water receptacle for forcing a current of air through the cooling chamber, a disc positioned above the fan and rotatable therewith, and means for conditioning the air from the fan by effecting a water spray by centrifugal action upon water fed onto the disc.

6. A combination water cooler and air conditioner including a drinking water storage device, a cooling chamber surrounding said device, a horizontally disposed rotatable fan beneath the chamber for forcing the air upwardly through said chamber, a disc mounted on top of said fan and rotatable therewith, means for supplying water from the storage device to the rotatable disc to spray said water into the air, an annular trough outside said disc to catch the drippings from the spray, and lying below the disc to provide an annular opening between the fan and trough, and means for rotating the fan whereby air is drawn up through said annular opening by the fan, over water in said trough and through a spray from said disc to cool and condition said air.

7. A device for cooling water and conditioning air, including a drinking water container, a cooling chamber surrounding said container, means for drawing air into said device and delivering an air blast to said chamber, means disposed beneath said container to spray cooled water into the air blast before it is blown into the chamber whereby to cool and condition said air and to cool the water in the container.

8. A device for cooling water and conditioning air including a drinking water container, a cooling chamber surrounding said container, a horizontally disposed rotatable fan beneath the cooling chamber for forcing air upwardly through the chamber, a disc mounted above said fan and rotatable therewith, a motor for rotating said fan having a vertical shaft connecting it therewith, a water valve opening from said water container to discharge water on said disc, and means for automatically controlling said valve, said means including a governor movable on said motor shaft upon rotation thereof, whereby water is fed to the rotating disc and sprayed into the upwardly forced air to cool and condition the same.

9. A combination air conditioner and water cooler for room installation comprising a water storage device having an outer corrugated wall, a water inlet, and a filter for purifying the water carried in said device, an annular air-washing chamber surrounding the water storage device with the outer corrugated wall of said storage device forming the inner wall of said chamber and baffle plates mounted on the outside wall to form an annular baffled passageway for water and air, a horizontally disposed rotatable fan beneath the storage device for forcing the air upwardly into the washing chamber, and nozzles and connecting means extending from the storage device to spray water into the chamber to wash the air whereby it is cooled and conditioned for discharge into the room in which the apparatus is installed.

10. A combination water cooler and air conditioner including a movable cabinet, a water storage device carried in the upper portion of the cabinet, a cooling chamber surrounding the water storage device having an air outlet at the top thereof, an air inlet in the lower portion of the cabinet, a fan horizontally disposed beneath the water storage device for drawing air into the lower portion of the cabinet through the inlet, and forcing said air upwardly through the cooling chamber to the outlet, and means for supplying moisture to the air in the cooling chamber whereby upon rotation of the fan conditioned air is forced out of the cabinet into the room in which it is situated.

11. A combination water cooler and air conditioner including a water storage device, a cooling chamber surrounding the water storage device, a horizontally disposed fan rotatably mounted beneath the water storage device for forcing air upwardly through the cooling chamber, a water-proof disc carried on the top of the fan, and means for feeding water onto said disc, whereby upon rotation of the fan said water is thrown into the air to condition the same.

12. A combination water cooler and air conditioner including a water storage device, a cooling chamber surrounding the water storage device, a rotatable fan horizontally disposed beneath the water storage device, means for feeding water on to the fan, and a trough mounted outside the fan to catch drippings therefrom and positioned in a manner whereby upon rotation of the fan air is drawn upwardly over the water in the trough and is sprayed by water from the fan, with said air being forced upwardly by the fan through the cooling chamber.

13. A combination water cooler and air conditioner including a cabinet having an enlarged opening at the top thereof for receiving a water filter adapted to rest on the edge of the opening, a water receiving chamber in the top of the filter, an upended water bottle supported at the top of the receiving chamber to feed water therein, a water storage chamber supported in the cabinet around the filter to receive water therefrom, an air chamber surrounding the water storage chamber, a rotatable fan horizontally disposed beneath the water storage device to draw air into the cabinet and force it upwardly through the air chamber, means for supplying moisture to the air to cool and condition the same whereby to cool the water in the water storage device, and an outlet from the air chamber whereby the conditioned air is blown from the cabinet into the room.

14. A combination water cooler and air conditioner including a cabinet, a water storage device carried in the upper portion of the cabinet, an air chamber around the water storage device, a fan mounted below the water storage device to force air upwardly through the air chamber, means for supplying moisture to the air, and an insulating wall surrounding the air chamber having fuller's earth therein to provide insulation for said air chamber and to assist in the cooling of the moist air in the chamber to cool the water in the storage device.

15. A combination water cooler and air conditioner including a cabinet having an enlarged opening at the top thereof for receiving a water filter, said filter comprising an integral supporting rim, a water receiving chamber and an earthenware filter portion extending downwardly from the receiving chamber, a vertical passage in the filter portion opening into the receiving chamber to carry water from said chamber to the filter portion, and charcoal removably carried in said passage to assist in the purification of the water flowing therethrough, a water storage device surrounding the filter having a connection extending outside said cabinet for supplying filtered drinking water, an air chamber surrounding the water storage device, a fan rotatably mounted below said storage device for drawing air into the cabinet and blowing it upwardly through the air chamber, and means for supplying filtered water to the air to condition the same.

16. In an air conditioning unit, a cabinet, a water receptacle in the top of the cabinet, a water supply to the receptacle, and means for automatically controlling the volume of said supply, an air chamber surrounding said water receptacle having an outlet at the top thereof, air inlets in the lower portion of the cabinet, a rotatable fan mounted below the water receptacle adapted to draw air upwardly through the air inlets and force it through the air chamber, and means for feeding water from said receptacle into the path of the air to condition said air to be blown from said outlet.

JOHN C. WICHMANN.